(12) United States Patent
Simske et al.

(10) Patent No.: US 9,218,543 B2
(45) Date of Patent: Dec. 22, 2015

(54) SELECTING CLASSIFIER ENGINES

(75) Inventors: Steven J Simske, Fort Collins, CO (US); Malgorzata M Sturgill, Fort Collins, CO (US); Jason S Aronoff, Fort Collins, CO (US); Paul S Everest, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/364,749

(22) PCT Filed: Apr. 30, 2012

(86) PCT No.: PCT/US2012/035730
§ 371 (c)(1),
(2), (4) Date: Jun. 12, 2014

(87) PCT Pub. No.: WO2013/165336
PCT Pub. Date: Nov. 7, 2013

(65) Prior Publication Data
US 2015/0071556 A1    Mar. 12, 2015

(51) Int. Cl.
*G06K 9/80* (2006.01)
*G06K 9/62* (2006.01)

(52) U.S. Cl.
CPC ............ *G06K 9/6227* (2013.01); *G06K 9/6256* (2013.01); *G06K 9/6286* (2013.01)

(58) Field of Classification Search
None
See application file for complete search history.

(56) References Cited

U.S. PATENT DOCUMENTS

| | | | |
|---|---|---|---|
| 7,418,123 B2 | 8/2008 | Giger et al. | |
| 7,558,766 B1* | 7/2009 | Forman | G06K 9/6256 706/20 |
| 2005/0065789 A1* | 3/2005 | Yacoub | G10L 15/32 704/231 |
| 2006/0074828 A1* | 4/2006 | Heumann | G06K 9/6217 706/20 |
| 2008/0063265 A1* | 3/2008 | Sathyanarayana | G06K 9/6256 382/159 |
| 2008/0270203 A1 | 10/2008 | Holmes et al. | |
| 2009/0307148 A1 | 12/2009 | Cardoza | |
| 2009/0324051 A1 | 12/2009 | Hoyt et al. | |
| 2010/0017330 A1 | 1/2010 | Tan | |
| 2010/0158356 A1* | 6/2010 | Ranzato | G06K 9/6256 382/159 |
| 2011/0066648 A1 | 3/2011 | Abhyanker et al. | |

OTHER PUBLICATIONS

Kim, Y. et al., "A Forensic Investigation for Suspects' digital evidences using Image Categorization", (Research Paper), Advanced Software Engineering and Its Applications, Dec. 13-15, 2008, pp. 241-244, Hainan Island.

Li, C. T., "Unsupervised Classification of Digital Images . . . ", Proc of the 2010 IEEE Int'l Symp on Circuits and Systems, May 30, 2010-Jun. 2, 2010, pp. 3429-3432, Paris.

(Continued)

*Primary Examiner* — Brian P Werner
(74) *Attorney, Agent, or Firm* — Leffert Jay & Polglaze, PA

(57) ABSTRACT

Methods, and apparatus for performing methods, for selecting a classifier engine. Methods include, for two or more portions of a set of items of known classification, classifying members of each portion using a particular classifier engine; selecting a portion of the set of items whose classifications satisfy a first criteria; classifying members of the selected portion of the set of items using two or more classifier engines; and selecting a classifier engine whose classification of the selected portion of the set of items satisfies a second criteria.

18 Claims, 4 Drawing Sheets

(56) References Cited

OTHER PUBLICATIONS

Simske, S. et al., "Meta Algorithmic Systems for Document Classification", DocEng'06, Oct. 10-13, 2006, Amsterdam, The Netherlands, Copyright 2006 ACM, 9 Pgs.

Sportiello, L. et al., "File Block classification by Support Vector Machines", (Research Paper), Sixth International Conference on Availability, Reliability and Security (ARES), Aug. 22-26, 2011, pp. 307-312, Vienna.

* cited by examiner

SELECTING CLASSIFIER ENGINES

BACKGROUND

Counterfeiting is a major concern for brand owners. It has been estimated that 8% of world trade could be counterfeit goods. This has the potential to create significant health, safety and security threats depending on the nature of the goods. As with other broad security concerns, elimination of counterfeiting is not practicable. It is thus generally important for brand owners to be able to identify counterfeiting.

DETAILED DESCRIPTION

Figure 1:
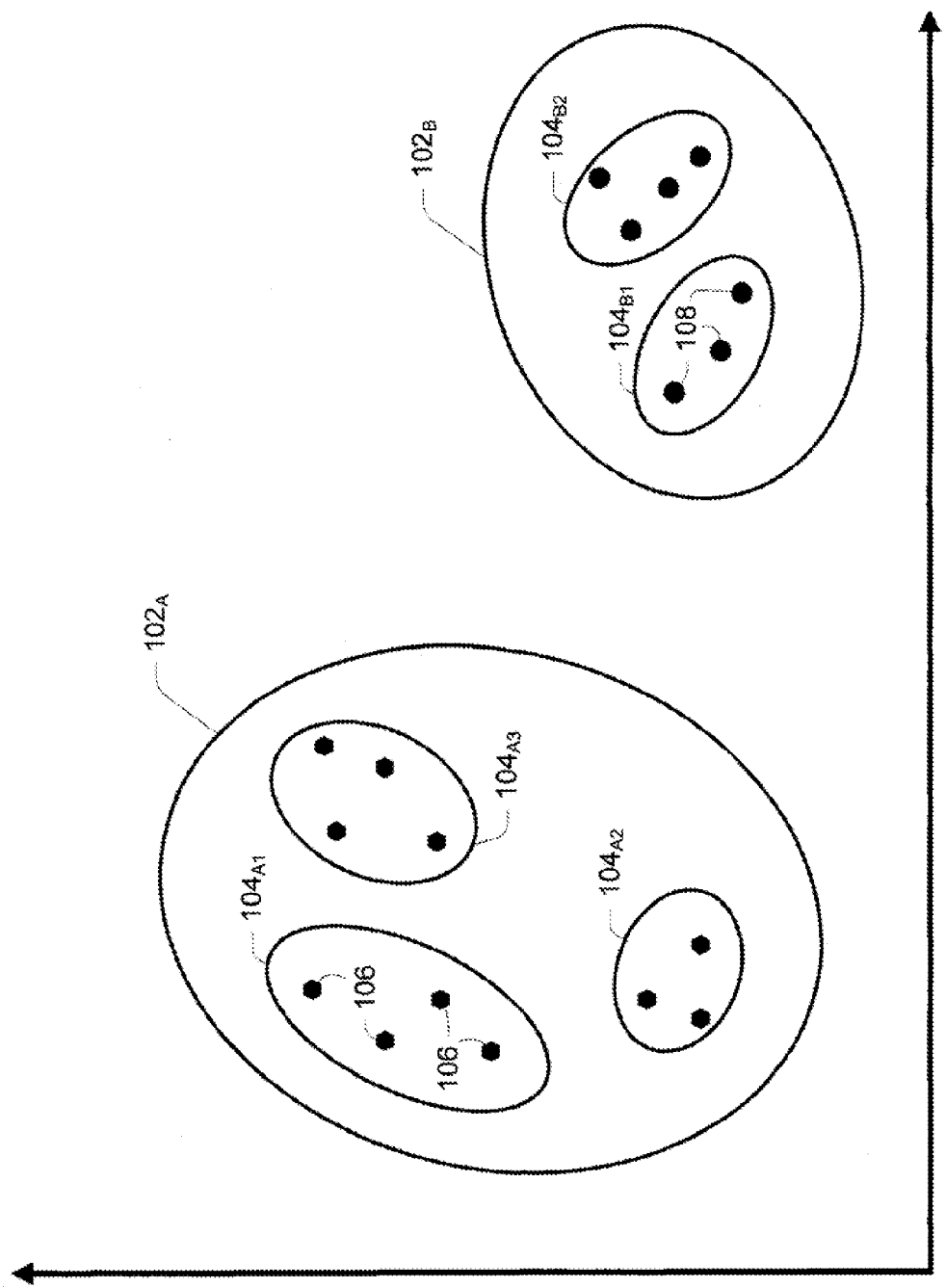
FIG. 1 is a representation of the classification of a set of items having known classifications for use in describing various implementations herein.

Printing is often used to convey branding information. It is thus important for brand owners to be able to determine whether printing was performed by an authentic or a counterfeit printer/label converter. Various implementations described herein seek to address this need.

As noted, it may not be practicable to expect to eliminate counterfeiting. A more practical and proactive plan may be to attempt to determine the relative size of each counterfeiter, and address the largest counterfeiters first. Since counterfeit material shows up through different channels, various implementations seek to facilitate identifying commonalties between a number of sample images. Samples exhibiting similar characteristics might be logically suspected of originating from the same source. As such, various implementations seek to select one or more classifier engines to facilitate an improved classification of those sample images. Classification generally refers to a statistical process of identifying a sub-population to which an item of interest belongs on the basis of the analysis of metrics of the item of interest against a training set of data containing metrics from other items whose sub-populations are known (e.g., deemed to be known). Known classifier engines include Bayesian classifier engines, Gaussian classifier engines, AdaBoost (Adaptive Boosting) classifier engines, SVM (Support Vector Machine) classifier engines, etc. As used herein, a classifier engine is a combination of software (e.g., machine-readable instructions) and hardware (e.g., a processor), such that the software is configured to cause the hardware to predict how a new item should be classified based on shared or similar metrics of other items, which may include previously classified items. While various implementations compare multiple classifier engines, they are not tied to any single or particular type of classifier engine.

For various implementations, systems and methods are described that select a ground truth set (sometimes referred to as a tagged training set) of items (e.g., images) from a set of items having known (e.g., deemed to be known) classifications, and then select a classifier engine from two or more classifier engines based on a comparison of their results against the ground truth set.

Various implementations will be described with reference to classification of images. It will be apparent that these implementations are extendable to a variety of images and image types, as well as to other items to which some metric may be quantified. Images could include photographs, graphics, charts, one-dimensional and two-dimensional code symbols (e.g., barcodes and QR codes), text, etc., or some composite of these elements. Images might include scanned images of external product packaging, scanned images of product labeling, scanned images of product inserts (e.g., quick-start guides, user guides, instructions, warnings, regulatory information, etc.), etc. Images might further include a composite images of two or more of the foregoing, such as a front panel and back panel of external product packaging, for example.

Various implementations utilize one or more metrics, i.e., some quantification, of some aspect of the item of interest, e.g., an image. It is noted that it may be that some metrics do not provide a positive contribution to the classification. For example, metrics with high variance may represent just "noise" in the system. Thus, some metrics may in fact be detrimental to the classification (e.g., the metrics contain a false signal or negatively contribute to variability), which can happen, for example, when the math used to calculate the metric includes a discontinuity (such as dividing by zero). There are several ways to address such concerns.

One method of mitigating detrimental metrics includes eliminating or discarding metrics that do not resolve to a finite set of Gaussian or near-Gaussian distributions. For example, if the distributions created by the clustering algorithm/aggregator are skewed, bimodal, flat, etc., then they may be noisy, may model a phenomena that changes over time (e.g., temporal drift) with non-uniform sampling over time, may represent more than one phenomena such that the combination is non-Gaussian, etc., and might be eliminated.

Another method of mitigating detrimental metrics includes eliminating or discarding metrics with a greatly different number of aggregates than the mean of all metrics. This may be implemented through weighting. For example, weighting may be inversely proportional to the difference in the number of aggregates obtained for the metric from the mean number of aggregates across all metrics.

Still another method of mitigating detrimental metrics includes eliminating or discarding metrics with lower aggregate-aggregate discrimination. For example, suppose that the mean number of aggregates is four, and, for the given metric, there are a default of six aggregates. If this overall metric distribution is then forced to fit into four aggregates, all metrics may be effectively normalized to the same distribution model. Then each metric can be directly compared based on a simple F-score of F=(Mean-Squared Error Between Aggregate Means)/(Mean-Squared Within the Aggregates). Mean Squared Error is simply the sum squared error divided by the degrees of freedom (n−1). Metrics having better discrimination between the mean number of, or higher values of F, may provide more accurate classification. Forcing a distribution to a particular number of aggregates can be done in several ways, including direct aggregation when the number is higher, and splitting of the least Gaussian aggregates when the number is lower.

Although various implementations are not limited to a particular metric, example metrics could look to a variety of measurable aspects. For example, in the case of images, an original RGB (red, green, blue) image could be mapped to transform the image as provided below:

1: R channel
2: G channel

3: B channel
4: Cyan, C=(G+B−R+255)/3, channel
5: Magenta, M=(R+B−G+255)/3, channel
6: Yellow, Y=(R+G−B+255)/3, channel
7: Hue
8: Saturation=max(R,G,B)*(1−min(R,G,B)/sum(R,G,B))
9: Intensity=(R+G+B)/3
10: Pixel Variance ("edge" space), the latter defined as the mean difference (in intensity) between a pixel and its four diagonally closest neighboring pixels. This is closely related to a Laplacian edge filter.

Other mappings are possible. Regardless of the selected mappings, a variety of statistical analyses could be performed for each mapping. Example statistical analyses could include a variety of categories. A first category might be considered to be histogram metrics. Such metrics might include Mean, Entropy, StdDev, Variance, Kurtosis, Pearson Skew, Moment Skew, 5% Point (value of index in histogram below which 5% of the histogram lies), 95% Point (value of index in histogram below which 95% of the histogram lies), and 5% to 95% Span performed on one or more of the mappings. Other categories might be considered to be projection profile metrics for both horizontal and vertical profiles of the mappings. Such metrics might include Entropy, StdDev, Delta Entropy, Delta StdDev, Mean, Mean Longest Run, Kurtosis, Pearson Skew, Moment Skew, Delta Kurtosis, Delta Pearson Skew, Delta Moment Skew, Lines Per Inch, Graininess, Pct In Peak, Delta Mean. For the "Delta" metrics, the differences between consecutive profiles in the projection data might be used as the primary statistics.

It is noted that metrics for classification could be applied to an image as a whole, or to portions of the image. See, e.g., PCT Patent Application Serial No. U.S. Ser. No. 12/29,433, filed Mar. 16, 2012 and titled, "Classifying Images" for discussion of classification of tessellated images.

FIG. 1 is a representation of the classification of a set of items, e.g., images or data representative of images, having known (e.g., deemed to be known) classifications. The representation of FIG. 1 depicts two classes, i.e., class $102_A$ and class $102_B$. This representation further depicts class $102_A$ to have three subclasses, i.e., subclass $104_{A1}$, subclass $104_{A2}$ and subclass $104_{A3}$, and depicts class $102_B$ to have two subclasses, i.e., subclass $104_{B1}$ and subclass $104_{B2}$. The set of items includes all members of each of the identified classes 102, i.e., all members 106 of subclasses $104_{A1}$, $104_{A2}$ and $104_{A3}$, and all members 108 of subclasses $104_{B1}$ and $104_{B2}$ in the example of FIG. 1. As will be described, the ground truth set used in evaluating classifier engines may include all, or less than all, of the members of each of the identified classes 102.

As one example, the set of items might contain images (or data representative thereof) of samples of authentic product packaging (e.g., product packaging deemed to be authentic as sourced from one or more authorized printers) and of samples of counterfeit product packaging (e.g., product packaging deemed to be counterfeit as sourced from known counterfeiters or from unknown or unauthorized printers). With reference to FIG. 1, the class $102_A$ may represent the samples of authentic product packaging, and the three subclasses, i.e., subclass $104_{A1}$, subclass $104_{A2}$ and subclass $104_{A3}$, may represent samples of authentic product packaging obtained from three different authorized printers or printer lines. Similarly, the class $102_B$ may represent the samples of counterfeit product packaging, and the two subclasses, i.e., subclass $104_A$ and subclass $104_{B2}$, may represent samples of counterfeit product packaging obtained from two different known counterfeiters or otherwise unknown or unauthorized printers.

As sample items from the same class can come from multiple sources, various implementations may seek to determine whether improvements in the ground truth set can be facilitated by ignoring one or more members of the set of items. This determination is analogous to some aspects of support vector definition. In each case, certain samples may be ignored as being irrelevant to the definition of the salient descriptors of the classifier engine. However, the approach outlined below may ignore samples that do not "group" correctly, whereas for support vector definition, samples not near the boundary between classes may be ignored since they do not help define this boundary, or "manifold."

To determine a representative portion (e.g., combination of subclasses), various portions of the set of items (e.g., various combinations of subclasses) may be classified using a particular classifier engine, and those determined classifications can be evaluated against the known classifications to determine which portion (e.g., combination of subclasses) satisfies (e.g., best satisfies relative to other combinations of subclasses) some particular criteria. For example, metrics may be obtained from mapping a representative portion of the images of the samples of product packaging, and performing statistical analyses on one or more of the mappings, as described above. These metrics could then be analyzed by the classifier engine to determine which samples of the representative portion should be assigned to which class.

The criteria may be indicative of the performance of the classifier engine in correctly classifying the items of each evaluated portion. Such criteria might include precision, recall and accuracy (p, r and a, respectively). The criteria might be based on a single measure, such as p>0.98, or might include multiple measures, such as p>0.98 and a>0.95, for example. The criteria may also be based on relative values. For example, selection may look to which portion of the set of items resulted in an accuracy closest to one (1) of all of the portions evaluated. Precision, recall and accuracy for a particular class A may be given by:

$$p_A = C_A/R_A$$

$$r_A = C_A/S_A$$

$$a_A = 2(p_A)/(p_A + r_A)$$

where:
$C_A$=the number of samples correctly classified by the classifier engine as a member of class A
$S_A$=the number of samples known to be in class A in the ground truth set
$R_A$=the number of samples classified as a member of class A (correctly and incorrectly) by the classifier engine For various implementations, portions for evaluation might include all combinations of subclasses containing at least one subclass from each known class. In general, for each class A with $A_N$ subclasses, there are $2^{A_n}-1$ combinations of subclasses containing at least one subclass. When dealing with M classes ($C_1, C_2, C_3, \ldots C_M$) the total number of combinations that might be considered in this example could be represented by:

$$\prod_{i=1}^{M} (2^{(C_i)_N} - 1)$$

Where more than one class is included in the set of items, the selected criteria might look to an average value of all classes, a weighted average based on a number of members in each class, a minimum value for all classes, a maximum value for all classes, etc.

After selection of a portion (e.g., combination of subclasses) of the set of items that satisfies the criteria, the selected portion is the ground truth set for subsequent evaluation of two or more classifier engines. The two or more classifier engines may include the classifier engine used in selecting the ground truth set, or may include different classifier engines exclusive of the classifier engine used in selecting the ground truth set.

For selection of a classifier engine for classification of items of unknown classification, this selected portion of the set of items (i.e., the ground truth set) is classified using the two or more classifier engines. The results of each classification is evaluated against a particular criteria to determine which of the classifier engines satisfies (e.g., best satisfies relative to other combinations of subclasses) that particular criteria. The criteria for selection of the classifier engine may follow the same guidelines provided regarding the criteria for selection of the ground truth set, and may be the same or a different criteria. For example, the criteria for selection of the classifier engine might utilize the same performance measures, but set a baseline level at the performance of the classifier engine utilized to select the ground truth set, e.g., to select a classifier engine that provides an improved performance relative to the classifier engine utilized to select the ground truth set. For another example, the criteria for selection of the classifier engine might utilize different performance measures, e.g., selection of the ground truth set being based on precision, but selection of a classifier engine based on accuracy.

Figure 2:
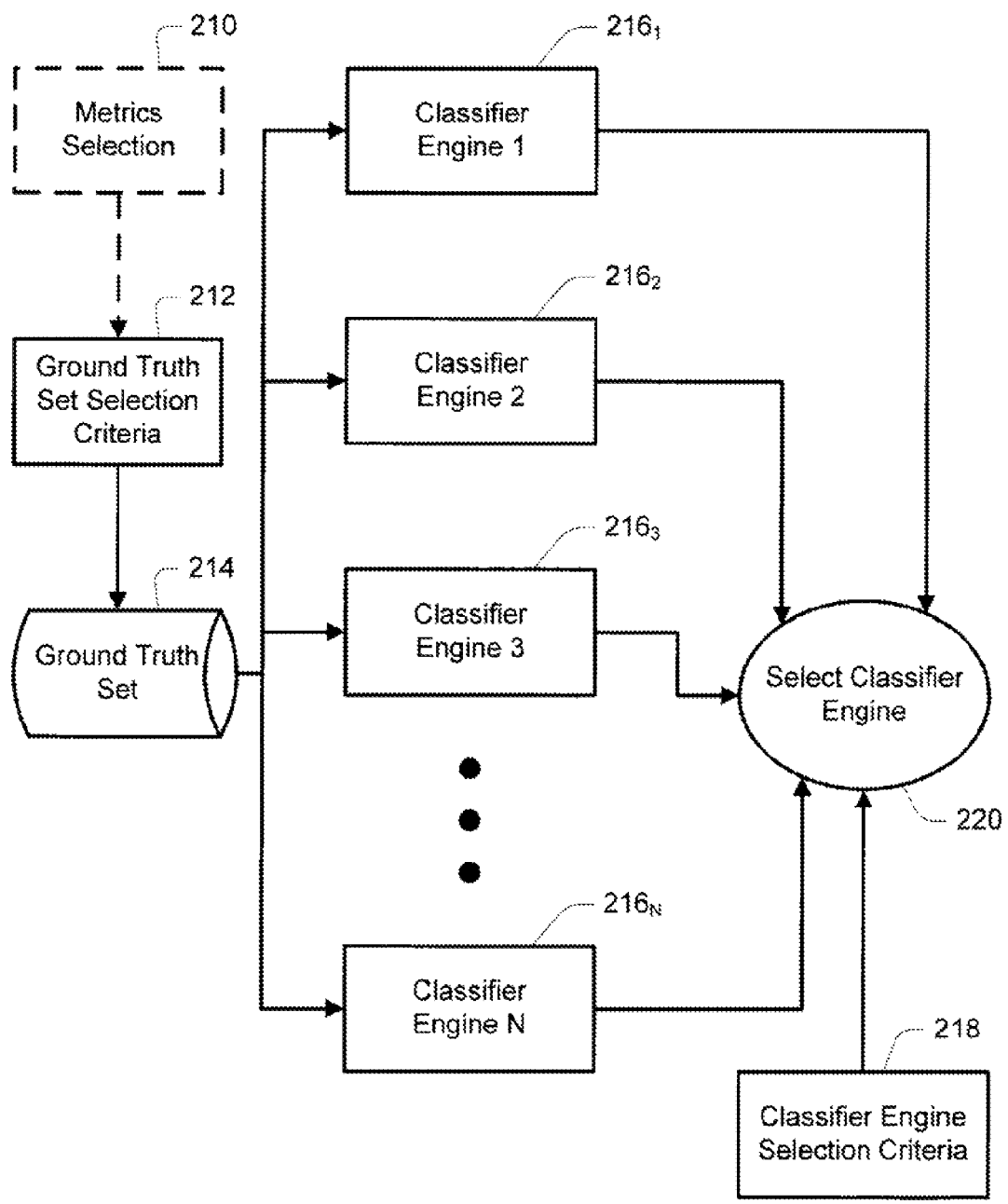
FIG. 2 depicts conceptually a system for selecting a classifier engine in accordance with various implementations.

FIG. 2 depicts conceptually a system for selecting a classifier engine in accordance with various implementations. Metric selection 210 might be provided to select one or more metrics for classification of items. Ground truth set selection criteria 212 is provided to determine the ground truth set 214 for evaluation of the classifier engines $216_1$-$216_N$. Classifier engine selection criteria 218 is provided to determine which classifier engine to select for subsequent classification of items of unknown classification.

Further improvements might be facilitated by the selection of some combination of classifier engines through a meta-algorithmic pattern approach. Discussion of combination of classifier engines through a mete-algorithmic pattern approach may be found in S. J. Simske et al., "Meta-Algorithmic Systems for Document Classification," *DocEng* '06, Oct. 10-13, 2006, Amsterdam, The Netherlands. A meta-algorithmic pattern as used herein refers to the use of multiple classifier engines in series and/or parallel patterns to provide a single classification decision that represents a decision logically and/or mathematically derived from the classification decisions of the pattern of classifier engines used. For example, a "Voting" pattern may be utilized, where decisions of each classifier engine (often non-equally weighted based on confidence) are summed, and the classification is selected according to the decision with the highest total weight. As another example, a "Predictive Select" pattern may be utilized. In a "Predictive Select" pattern, a precision of each classifier engine is determined for each class. The decision of the classifier engine having the highest precision relative to the other classifier engines for its reported class is selected. Other meta-algorithmic patterns may also be utilized.

Comparison of a meta-algorithmic pattern of classifier engines could be made against the same criteria used above for selection of a classifier engine. For purposes herein, a meta-algorithmic pattern of classifier engines will be deemed to be a classifier engine, different than the one or more classifier engines used in the meta-algorithmic pattern. For example, classifier engine 3 ($216_3$) of FIG. 2 might be a meta-algorithmic pattern of classifier engines utilizing classifications of classifier engine 1 ($216_1$) and classifier engine 2 ($216_2$) to generate its classifications.

Figure 3:
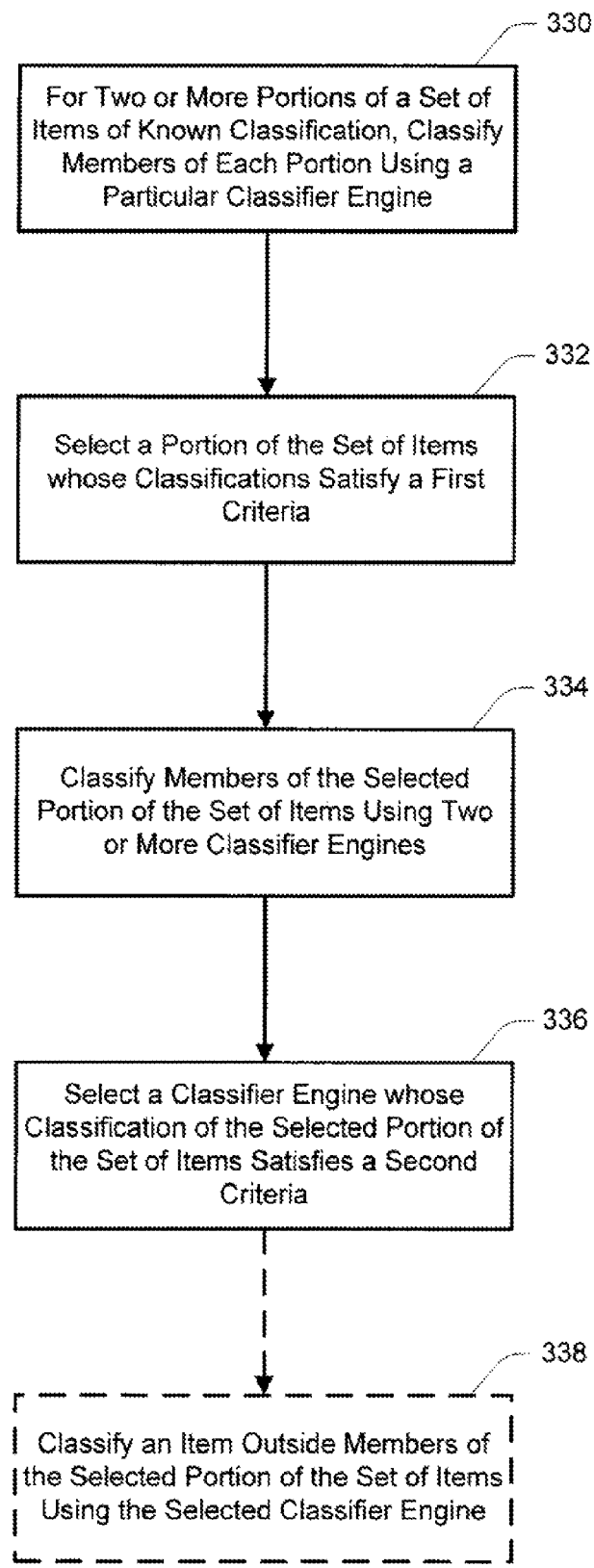
FIG. 3 is a flowchart of a method of selecting a classifier engine in accordance with various implementations.

FIG. 3 is a flowchart of a method of selecting a classifier engine in accordance with various implementations. At 330, for two or more portions of a set of items of known classification, members of each portion are classified using a particular classifier engine. For example, the particular classifier engine might include a Bayesian classifier engine, a Gaussian classifier engine, an AdaBoost classifier engine, an SVM classifier engine, etc. For certain embodiments, the set of items of known classification represent a set of images of samples of product packaging from product packaging deemed to be authentic and of product packaging deemed to be counterfeit. Classification of such images of samples of product packaging could be performed in response to metrics as described above. The two or more portions of the set of items might include various combinations of subclasses of the classes of the set of items. For example, with reference to FIG. 1, one portion might include subclasses $104_{A1}$, $104_{A2}$ and $104_{B2}$; another portion might include subclasses $104_{A3}$, and $104_{B1}$; still another portion might include subclasses $104_{A1}$, $104_{A2}$, $104_{A3}$, $104_{B1}$ and $104_{B2}$; etc. For certain embodiments, the combination of subclasses includes images of samples of product packaging from product packaging deemed to be authentic and of product packaging deemed to be counterfeit.

At 332, a portion of the set of items whose classifications satisfy a first criteria is selected, i.e., as the ground truth set. The selected portion may represent that portion that, relative to the other portions, best satisfies the first criteria. For example, the selected portion of images of samples of product packaging might represent that portion, relative to the other portions of the set of images of samples of product packaging that, relative to the other portions, best satisfies some criteria, e.g., some combination of precision, recall and/or accuracy as described above. At 334, the selected portion of the set of items is classified using two or more classifier engines. The two or more classifier engines might include the particular classifier engine, or may be a number of classifier engines exclusive of the particular classifier engine. At 336, a classifier engine, of the two or more classifier engines, whose classifications of the selected portion of the set of items satisfy a second criteria is selected for subsequent classification of items outside of the set of items from which the portion was selected. The selected classifier engine may represent that classifier engine that, relative to the other classifier engines, best satisfies the second criteria. The selected classifier engine could then be used to assign a classification to an item outside members of the selected portion of the set of items at 338. For example, metrics might be obtained from mapping an image of a new sample of product packaging, such as from a suspected counterfeit, and performing statistical analyses on one or more of the mappings, as described above. These metrics could then be analyzed by the selected classifier engine to determine to which classification the new sample of product packaging should be assigned. For certain embodiments, the metrics used for classification in 330, 334 and 338 might be the same metrics.

Furthermore, upon selection of a classifier engine whose classifications of the selected portion of the set of items satisfy the second criteria, this selected classifier engine could be used as the particular classifier engine at 330 to perform a subsequent iteration of the method of FIG. 3, selecting a new ground truth set with the selected classifier engine at 332, classifying the new ground truth set with the two or more classifier engines at 334, and re-selecting a classifier engine for subsequent classification of items outside the set of items from which the ground truth set was selected. Such re-iteration of the method may facilitate further improvements in performance of the selected classifier engine. In this way, the method facilitates learning over time, and adapting to changes in the salient set of items to be classified.

It will be appreciated that implementations of the present disclosure can be instantiated by machine-readable instructions, e.g., software, configured to cause a processor to perform methods disclosed herein. The machine-readable instructions can be stored on non-transitory storage media in the form of volatile or non-volatile storage. Examples of storage media include solid-state memory (e.g., Read-Only Memory (ROM), Random-Access Memory (RAM), Flash memory, etc.); optical media (e.g., CD, DVD, Blu-Ray™ disks, etc.); and magnetic media (e.g., magnetic disks and disk drives, magnetic tape, etc.). Such storage media includes storage media as a component part of a computer system, storage media that is removable from a computer system, and storage media that is accessible to the computer system through a network, such as LAN (local area network), WAN (wide area network), Internet, etc., whether network access is available through wired connections or wireless connections.

Figure 4:
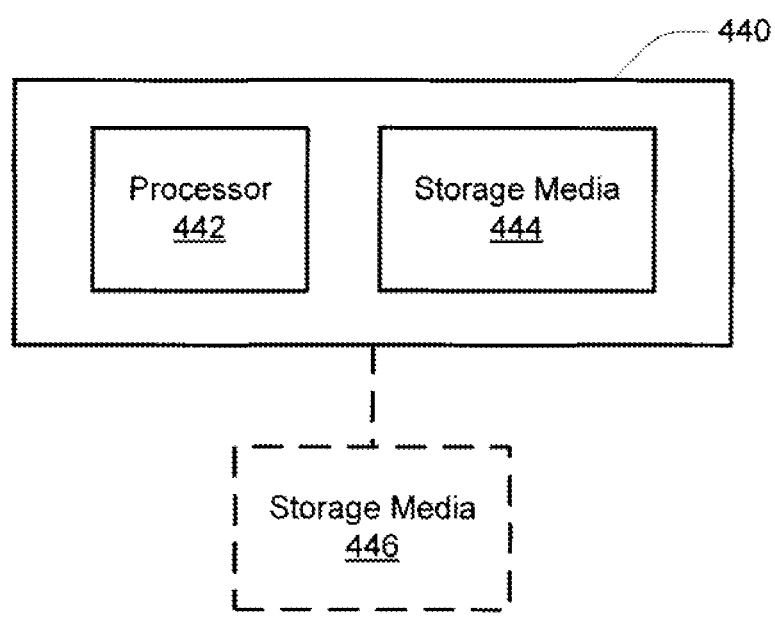
FIG. 4 is a block diagram of an example of a computer system for use with various implementations.

FIG. 4 is a block diagram of an example of a computer system 440 having a processor 442 and a computer-usable non-transitory storage media 444 in communication with the processor 440 for use with various implementations. The storage media 444, whether removable from, a component part of, or accessible to computer system 580, includes a non-transitory storage medium and may have machine-readable instructions stored thereon configured to cause the processor 442 to perform methods disclosed herein. For example, the storage media 444 could store machine-readable instructions to cause the processor 442 to provide the function of the classifier engines, to provide the selection of the ground truth set, to provide the selection of the classifier engine satisfying its selection criteria, and/or to provide the selection of metrics for classification of the ground truth set. The storage media 444 could further store the set of items and the ground truth set, including data representative thereof, and various selection criteria.

The computer system 440 may further be in communication with a computer-usable non-transitory storage media 446. The storage media 446 includes at least one storage media (e.g., removable or network-accessible storage media) storing the machine-readable instructions configured to cause the processor 442 to perform methods disclosed herein as part of an installation package to store the machine-readable instructions to storage media 444.

What is claimed is:

1. A method of selecting a classifier engine, comprising:
   for two or more portions of a set of items of known classification, classifying members of each portion using a particular classifier engine;
   selecting a portion of the set of items whose classifications satisfy a first criteria;
   classifying members of the selected portion of the set of items using two or more classifier engines; and
   selecting a classifier engine whose classification of the selected portion of the set of items satisfies a second criteria.

2. The method of claim 1, wherein classifying members of a portion of the set of items of known classification comprises classifying members of a portion of a set of images of known classification.

3. The method of claim 1, wherein classifying members of a portion of the set of items of known classification comprises classifying members of a combination of subclasses containing at least one subclass from each class of the set of items of known classification.

4. The method of claim 1, wherein selecting a portion of the set of items whose classifications satisfy a first criteria comprises selecting a portion of the set of items whose classifications best satisfy the first criteria relative to other portions of the two or more portions of the set of items of known classification.

5. The method of claim 1, wherein classifying members of the selected portion of the set of items using two or more classifier engines comprises using at least one meta-algorithmic pattern of classifier engines.

6. The method of claim 1, wherein selecting a classifier engine whose classification of the selected portion of the set of items satisfies a second criteria comprises selecting a classifier engine whose classification of the selected portion of the set of items best satisfies the second criteria relative to other classifier engines of the two or more classifier engines.

7. The method of claim 1, further comprising:
   for two or more second portions of the set of items of known classification, classifying members of each second portion using the selected classifier engine;
   selecting a second portion of the set of items whose classifications satisfy the first criteria;
   classifying members of the selected second portion of the set of items using the two or more classifier engines; and
   selecting a classifier engine whose classification of the selected second portion of the set of items satisfies the second criteria.

8. The method of claim 7, wherein classifying members of each second portion using the selected classifier engine comprises classifying members of the same portions that were classified using the particular classifier engine.

9. The method of claim 1, further comprising selecting metrics for use by the classifier engines to mitigate detrimental metrics.

10. A method of classifying an image, comprising:
    for two or more portions of a set of images of known classification, classifying members of each portion using a particular classifier engine in response to a set of metrics for each member of each portion;
    selecting a portion of the set of images whose classifications satisfy a first criteria;
    classifying members of the selected portion of the set of images using two or more classifier engines in response to the set of metrics;
    selecting a classifier engine whose classification of the selected portion of the set of images satisfies a second criteria; and
    classifying the image using the selected classifier engine in response to the set of metrics.

11. The method of claim 10, wherein classifying members of a portion of the set of images of known classification comprises classifying members of a combination of subclasses containing at least one subclass from each class of the set of images of known classification.

12. The method of claim 10, further comprising generating the set of images of known classification from images of product packaging deemed to be authentic and images of product packaging deemed to be counterfeit.

13. The method of claim 10, wherein classifying members of the selected portion of the set of images using two or more classifier engines comprises using at least one meta-algorithmic pattern of classifier engines.

14. The method of claim 10, further comprising selecting the set of metrics to mitigate detrimental metrics.

15. A non-transitory computer-usable storage media having machine-readable instructions stored thereon and configured to cause a processor to perform a method, the method comprising:
   for two or more portions of a set of items of known classification, classifying members of each portion using a particular classifier engine;
   selecting a portion of the set of items whose classifications satisfy a first criteria;
   classifying members of the selected portion of the set of items using two or more classifier engines; and
   selecting a classifier engine whose classification of the selected portion of the set of items satisfies a second criteria.

16. The non-transitory computer-usable storage media of claim 15, wherein the non-transitory computer-usable storage media stores the machine-readable instructions as part of an installation package to store the machine-readable instructions to another non-transitory computer-usable storage media in communication with the processor.

17. The non-transitory computer-usable storage media of claim 15, wherein the method further comprises:
   for two or more second portions of the set of items of known classification, classifying members of each second portion using the selected classifier engine;
   selecting a second portion of the set of items whose classifications satisfy the first criteria;
   classifying members of the selected second portion of the set of items using the two or more classifier engines; and
   selecting a classifier engine whose classification of the selected second portion of the set of items satisfies the second criteria.

18. The non-transitory computer-usable storage media of claim 15, wherein the method further comprises:
   classifying an item outside members of the selected portion of the set of items using the selected classifier engine.

\* \* \* \* \*